United States Patent [19]
Batchelder et al.

[11] Patent Number: 5,691,708
[45] Date of Patent: Nov. 25, 1997

[54] TEXT ABSTRACTION METHOD AND APPARATUS

[75] Inventors: Edward Marcus Batchelder, Brookline; R. Pito Salas, Arlington, both of Mass.

[73] Assignee: Lotus Development Corporation, Cambridge, Mass.

[21] Appl. No.: 514,809

[22] Filed: Aug. 14, 1995

[51] Int. Cl.$^6$ .............. H04B 7/00; G08B 5/22; H04M 11/00
[52] U.S. Cl. .............. 340/825.44; 340/825.47; 340/825.52; 455/41; 379/57
[58] Field of Search .......... 340/825.44, 825.22, 340/825.07, 825.52; 455/41, 151.1, 151.2, 152.1; 379/57, 58

[56] References Cited

U.S. PATENT DOCUMENTS

| | | | |
|---|---|---|---|
| 4,713,808 | 12/1987 | Gaskill et al. | 370/94 |
| 5,043,718 | 8/1991 | Shimura | 340/825.44 |
| 5,257,307 | 10/1993 | Ise | 379/57 |
| 5,258,739 | 11/1993 | DeLuca et al. | 340/825.44 |

FOREIGN PATENT DOCUMENTS 3-42923  2/1991  Japan.

*Primary Examiner*—Brian Zimmerman
*Assistant Examiner*—Yonel Beaulieu
*Attorney, Agent, or Firm*—Baker & Botts, L.L.P.

[57] ABSTRACT

A text message abstraction system and method allowing for the selection of important pieces of information based upon a number of criteria and for the removal of unnecessary components of a message. The abstraction system of the present invention is provided with an input message, a command set and a maximum message length and attempts to generate a message conveying all of the important information contained within the text message but within the maximum message length constraint.

46 Claims, 6 Drawing Sheets

TEXT ABSTRACTION METHOD AND APPARATUS

FIELD OF THE INVENTION

This invention relates generally to text processing systems and in particular to message processing for use in, for example, radio paging systems.

BACKGROUND OF THE INVENTION

There are many current systems which process textual messages. Radio paging systems are one specific example. Radio paging systems are well known and widely used. One particular format used in a paging systems is text transmission. In these systems, a series of characters representing a message is transmitted to a paging receiver for viewing on a display screen. Many paging receivers, however, have the unfortunate drawback that they can only display a message of limited length. For example, many paging receivers in use today are limited in that they can only display a message not to exceed 240 characters of text. Thus, when a user desires to transmit a message having more than 240 characters to such a paging receiver, the entire message can not be displayed. As a result, the paging receiver may react by displaying no message at all. More commonly, however, a message greater than the maximum length will be truncated at the maximum length thus leaving off the end of the message. As will be readily appreciated, such a situation is undesirable because a truncated message may be unintelligible to the reader and/or may omit critical information.

SUMMARY OF THE INVENTION

In view of the foregoing, it is an object of the present invention to overcome these and other drawbacks present in existing text processing systems.

It is a further object of the present invention to provide for compaction of textual data prior to transmission and/or storage.

Another object of the present invention is to provide for flexible control of text abstraction through a command set available to a system administrator or another authorized individual.

An additional object of the present invention is to provide a system and method for transmitting text messages such that all critical information may be conveyed to the intended recipient at a paging receiver.

A yet further object of the present invention is to abstract message text so that the substance of the message text may be conveyed to a recipient having a paging receiver which is unable to display message text beyond a given maximum number of characters.

In achieving the above and other objects, the present invention provides a text message abstraction system and method allowing for the selection of important pieces of information based upon a number of criteria and for the removal of unnecessary components of a message. The abstraction system of the present invention is provided with an input message, a command set and a maximum message length and attempts to generate a message conveying all of the important information contained within the text message but within the maximum message length constraint.

Additional features, objects and advantages of the present invention will be more clearly comprehended through the following detailed description together with the accompanying drawings.

DETAILED OF THE DESCRIPTION

Figure 1:
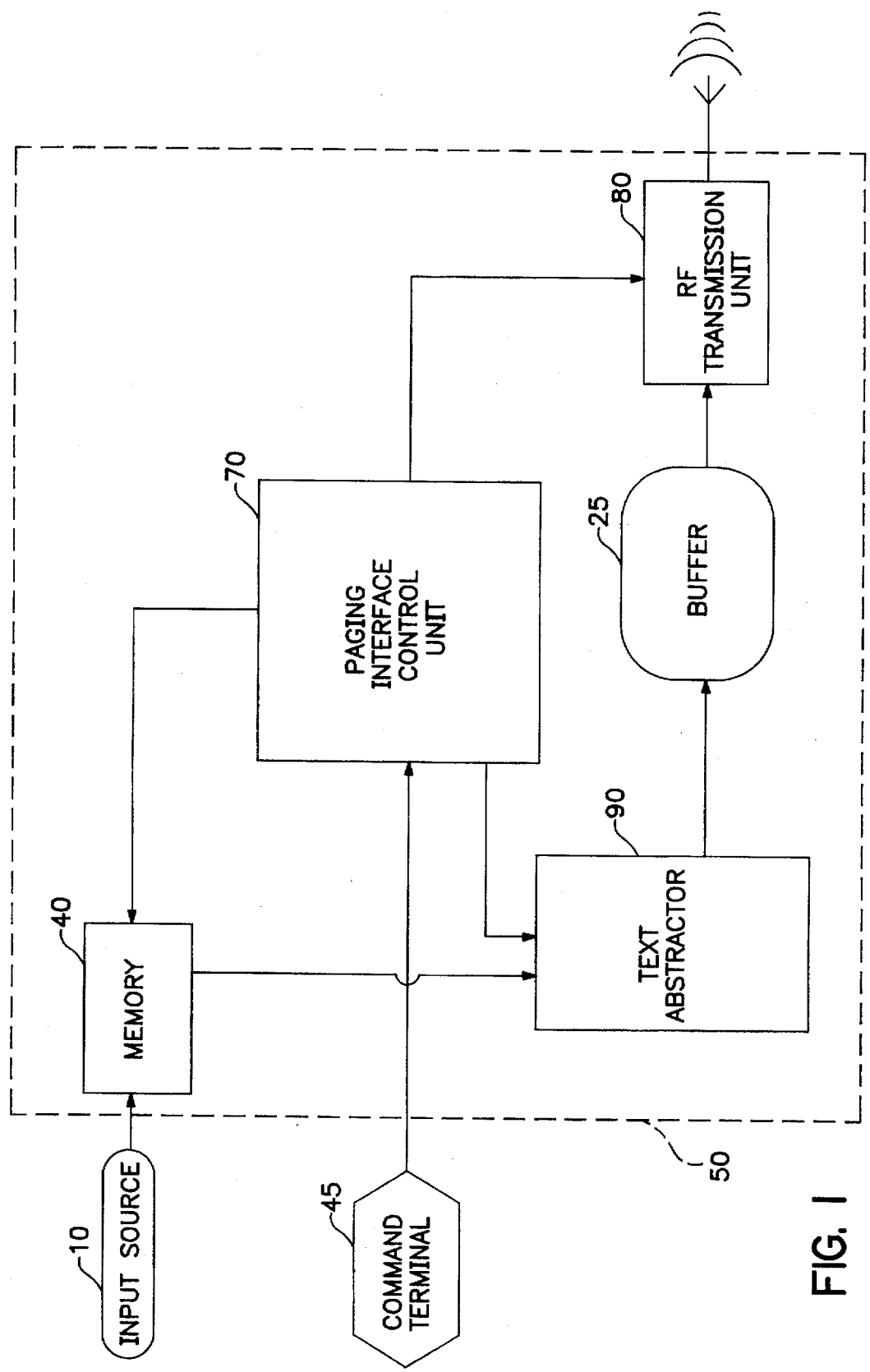
FIG. 1 is a block diagram of the preferred embodiment of a paging system incorporating a text abstraction system according to the teachings of the present invention.
Figure 2:
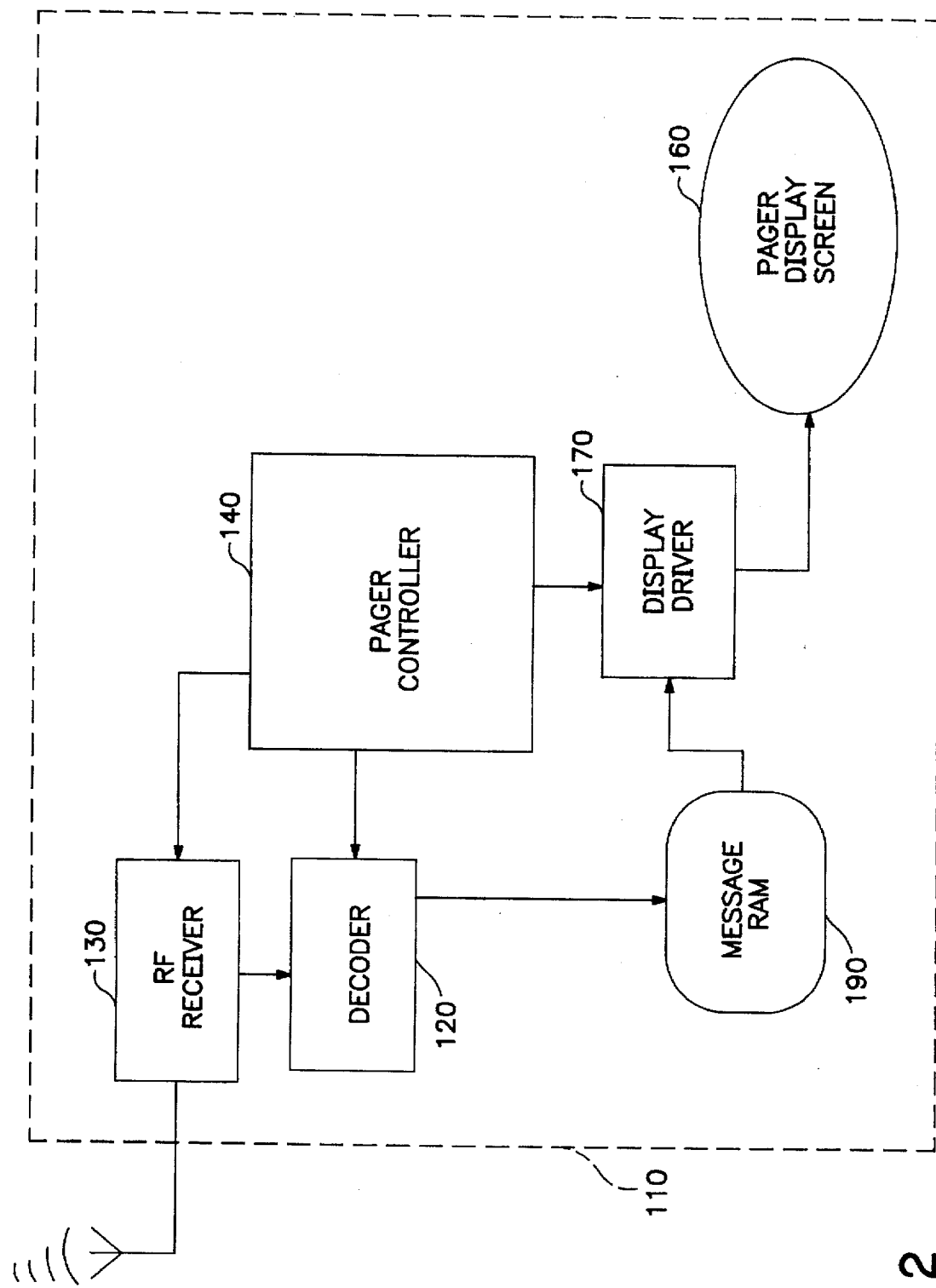
FIG. 2 is a block diagram of a paging receiver according to a preferred embodiment of the present invention.

FIG. 1 is a block diagram of the paging control system 50 of the present invention. The paging control system 50 as illustrated in FIG. 1 incorporates all necessary functionality for receiving a text message for transmission, abstracting that message and transmitting the abstracted message for viewing on a paging receiver. The paging receiver for receiving the abstracted message is illustrated in FIG. 2 and may or may not be limited to displaying a given maximum number of characters.

Turning now to the paging control system 50 illustrated FIG. 1, a text message is transmitted from an external input source 10 to paging control system 50. External input source 10 may comprise any of a variety of well known input sources currently used in paging systems. For example, external input source 10 may comprise a telephone receiver, wherein the telephone receiver is connected through a telephone network to paging control system 50. In this case, an individual desiring to transmit a message may key in, through the telephone keypad, a series of digits representing, for example a telephone number at which the individual may be reached.

In order to allow for the transmission of text messages beyond a simple seven or ten digit telephone number, it is typically necessary to use an input source other than a telephone receiver. Text messages comprising up to 240 characters may be transmitted to a paging receiver originating at specially configured input sources. For example, a portable "terminal" may be provided as input source 10 wherein a user may type in text to be transmitted. This terminal is connected to a conventional modem for transmission to the paging control system 50 for ultimate radio frequency transmission to the paging receiver 110. Alternatively, a user may call in a message to a human operator who uses such a terminal to type in the called in message. The message typed in by the human operator is supplied to the paging control system 50 and is eventually transmitted to the paging receiver 110. The present invention is primarily directed to the transmission of longer messages (i.e. those input through a "terminal") but may also encompass the transmission of short messages (i.e. telephone numbers entered through a telephone keypad).

As can be seen in FIG. 1, paging control system 50 further comprises memory 40 and paging interface control unit 70. Memory 40 stores the text message received from input source 10. Paging interface control unit 70 communicates with text abstractor 90, command terminal 45, memory 40 and RF transmission unit 80 to control the overall operation of paging control system 50. Text abstractor 90 functions to process the message text received from input source 10 so that the message text may be transmitted within the length constraints imposed by paging receiver 110 without the loss of any important information. The function of text abstractor 90 is discussed in detail below. As will also be discussed below, buffer 25 contains the result of processing by text abstractor 90—abstracted text. It is possible that buffer 25 and memory 70 comprise the same memory. RF transmission unit 80 reads the abstracted text from buffer 25 and transmits the abstracted text message to paging receiver 110. Prior to transmission, RF transmission unit 80 may further code or process the abstracted message data using various techniques as are well known in the art. Command terminal 45 is also provided for the input of various commands including commands necessary for controlling the operation of text abstractor 90.

It should be noted that this invention is not specifically limited to the specific structure of the paging control system illustrated in FIG. 1. As an example of an alternative embodiment for the paging control system it is possible for paging control system to comprise an application contained on a local area network whereby users may receive electronic mail at their respective address on such local area network. In this case, electronic mail may abstracted according to the teachings of this invention and then automatically routed through the network to an RF transmission unit either external or internal to the network. This would allow, for example, Internet messages to be automatically forwarded to a user at his or her pager when he or she is away from the network. It will be understood by one of skill in the art that the teachings of the present invention may further apply to devices other than pagers. As will become apparent, the present invention may be employed whenever it is necessary to transmit or store text in a compacted form.

FIG. 2 illustrates a pager which may be used in the paging system described by the current invention. Pager controller 140 is provided for controlling the overall operation of radio paging receiver 110. Pager controller 140 may comprise an "off-the-shelf" microprocessor such as any of the i486™ microprocessors manufactured by Intel Corporation. Radio paging receiver 110 preferably comprises a standard radio paging receiver incorporating a pager display screen 160. Pager display screen 160 is typically a liquid crystal display (LCD) capable of displaying textual information. Radio paging receiver 110 is capable of receiving radio broadcast (RF) paging signals which include textual information. The textual information, as transmitted by paging control system 50, may be represented in a variety of formats and/or coding schemes as are well known in the art. The form of the textual information as received by radio paging receiver 110 is not critical to the present invention as radio paging receiver 110 may receive any form of RF signal for processing according to the teachings of this invention. The RF paging signals are received by RF receiver 130 which may be connected to an external or internal antenna associated with radio paging receiver 110. Once received, the paging signals are decoded, if necessary, by decoder 120 into, for example, ASCII plain text data and stored temporarily in message RAM 190. Alternatively, decoder may serve to place the paging message in any form recognizable by display driver 170 and capable of being displayed by display driver 170 on pager display screen 160.

Figure 3:
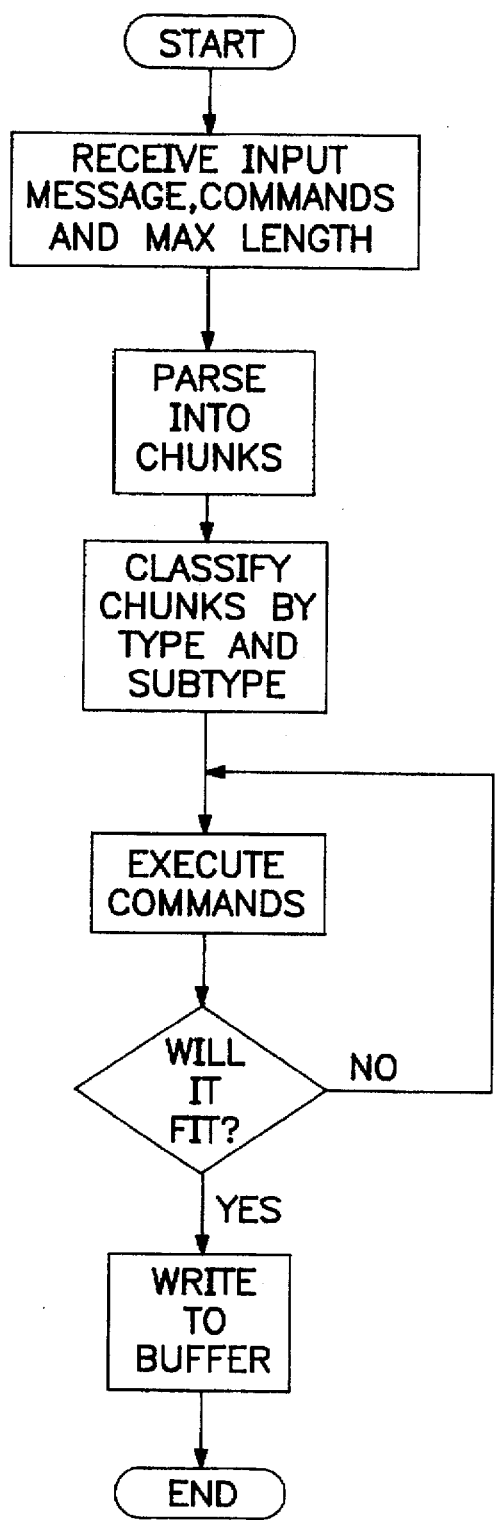
FIG. 3 is a flowchart describing the process of text abstraction according to a preferred embodiment of the present invention.

The function of text abstractor 90 contained within paging control system 50 is now described in detail and in connection with FIG. 3. In a broad sense, text abstractor 90 receives as input a text message or messages to abstract, a set of commands indicating how the abstraction is to be performed and a maximum length permissible for the abstracted text. The following description assumes that the message to be abstracted and transmitted is an electronic mail message. The function of the text abstractor, and thus of the present invention, however, is not limited thereto. The text abstractor may process any form of textual information such as documents, letters, books, articles or facsimiles, for example.

The first step in the abstraction process is to parse the text message into "chunks". The most common and preferred form of a chunk is a sentence although other forms of chunks such as words or paragraphs may be used. Each chunk is labeled as one of three types: MAIL HEADER, TEXT, or PUNCTUATION. In the context of messages other than electronic mail, these types may differ as appropriate for the form of textual information. Nonetheless, in the electronic mail environment, MAIL HEADER types are further classified as SIGNIFICANT or INSIGNIFICANT. Such further classification is referred to as classification into "sub-types". TEXT types are further classified by subtype according to position within a paragraph—either FIRST, LAST, ONLY, or OTHER. Thus, for example, if a single sentence (chunk) forms a paragraph, that sentence (chunk) will be labeled with the TEXT type and the ONLY subtype. If the sentence (chunk) is the first sentence of a paragraph containing multiple sentences (chunks), the sentence will be labeled with a TEXT type and with a FIRST subtype. PUNCTUATION chunks are those that contain no letters or digits. In the preferred embodiment there are no subtypes for the PUNCTUATION type.

MAIL HEADER types are preferably recognized by the text abstractor 90 through a list of mail header names such as "Subject", "From", "To", etc. which are read from an external file. This external file may be set up to include any key words desirable for locating MAIL HEADER data as specified by a user or administrator. In the preferred embodiment this file is named header.txt. Words in the header.txt file that are followed by an asterisk (or some other designating character) are considered significant headers and trigger MAIL HEADER SIGNIFICANT subtype classification.

In a preferred embodiment of the present invention, text abstractor 90 functions to assume that words contained in a "Subject" line of a MAIL HEADER are SIGNIFICANT regardless of whether the words would otherwise be INSIGNIFICANT as determined by the header.txt file. In this way, the message recipient will be assured to receive the full subject line contained in the MAIL HEADER. Further, the system may be designed (or configured by a user or administrator) to assume that the recipient's name (specified after the "To:" identifier) should be considered to be important, regardless of whether the name appears in the header.txt file as being INSIGNIFICANT. Additionally the system may be set up to assume that numbers (and times and dates), whether in the MAIL HEADER or in the TEXT portion, are important. Various combinations which are readily apparent to those of skill in the art may be selected to force particular character sequences (e.g. words and numbers) to be either SIGNIFICANT or INSIGNIFICANT.

It should also be noted that in one preferred embodiment of the invention, text abstractor 90 may operate such that multiple MAIL HEADERS in a single document are processed according to a defined criteria. This will typically occur in "replied-to" mail when a recipient replies to the original sender or when a message is forwarded to a third party. In many current electronic mail environments, it is possible to include the original message (including the original MAIL HEADER) within the replying or forwarded message. In such cases multiple MAIL HEADERs will be present in a single document. Text abstractor 90 may be configured to ignore all information in any MAIL HEAD- ERs beyond the first MAIL HEADER. Thus, all information (i.e. words, numbers and characters) in the mail message beyond the first mail message will be treated as unimportant.

Alternatively, text abstractor 90 may parse the first MAIL HEADER to determine the name(s) of the party receiving the message (i.e. the "To:" party). Text abstractor 90 may then operate to classify all future words in MAIL HEADERS containing the "To:" party's name (and possibly the TEXT following them) as unimportant. This operation is based on the assumption that the recipient of the current abstracted message has previously seen the previous message (as a sender or recipient) by virtue of his name appearing in a "secondary" MAIL HEADER. In various alternative embodiments, the "from" party may be the name triggering an indication the following words are unimportant or the presence of either the "from" or the "to" party in a secondary MAIL HEADER may be used to determine that all words in a MAIL HEADER and/or the TEXT following it are unimportant. The treatment of unimportant words is discussed in detail below.

Returning now to the process, once the message has been broken into chunks and the chunks have been labeled according to type and subtype, the text abstractor 90 serially executes the commands provided to it. Commands may be provided interactively to the text abstractor 90 or they may be contained in a file for execution in batch. Commands consist of single words separated by whitespace. Parameter assignments consist of a name and value separated by an equal sign. For example, the command:

ChunkBegin=A* indicates a single command assigning the value A* to the string parameter ChunkBegin. In a preferred embodiment, all commands and parameter names are case-insensitive, although parameter values are not. Boolean parameters can be give values "true", "false", "yes", "no", "0" or "1". If a boolean parameter is named without being given a value, it is equivalent to setting it to true.

Once all commands have been executed or it is determined (through a TRYFIT command, discussed below) that the message, as processed so far, will fit the maximum length constraint the abstracted text is written to buffer 25. Initially, the value of the string parameter ChunkBegin is written to buffer 25. The ChunkBegin parameter indicates the beginning of a chunk as it appears in buffer 25. In a preferred embodiment, the ChunkBegin parameter may be changed in the command sequence provided to text abstractor 90 so that the message recipient has an indication of how much and what type of abstraction was performed on the original document. When it is determined that the chunks have been processed such that they are ready for output, each chunk is written out to buffer 25 with the value of the string parameter ChunkSep written between each two chunks. In a preferred embodiment, the ChunkSep character is set to be a space ("0"). Alternatively, other characters may be used and/or the value may be set by the user. Finally, after all chunks have been written to buffer 25, the value of the string parameter ChunkEnd is written out. The ChunkEnd parameter indicates the end of the message as represented in buffer 25.

In the preferred embodiment, the default values for ChunkBegin and ChunkEnd are both empty strings. The default value for ChunkSep is a single space. Any string value can be assigned to these variables using commands, but since the value is delimited by whitespace, the string can not include whitespace. The ChunkSep string parameter is treated specially: the values "space", "lf" and "crlf" can be used to indicate a single space, a linefeed, or a carriage return linefeed pair, respectively.

As described above, the text abstractor 90 functions according to a list of commands provided either interactively through command terminal 45 or through a batch file. The teachings of this invention will become apparent to one of skill in the art through a description of each of the commands available in the operation of text abstractor 90. Such a listing and description of the commands available in the preferred embodiment of this invention now follows.

Command: TEXTONLY

This command deletes all non-TEXT chunks from the document. As a result, all subsequent operations executed by text abstractor 90 on the message act only on the remaining TEXT chunks.

Command: COUNTWORDS

The words in the document are tallied and the significance of each word is determined. The significance of a word depends on a number of factors as described below.

Command: SAVE This command may be used to save the current state of the text abstractor 90. The information which is saved includes the whole of the textual information which is being abstracted (i.e. the document) and the values of all parameters currently selected as well as the count of words in the text. In addition, dictionaries indicating STOP words and/or SIGNIFICANT words may be saved. The information is saved by pushing on a stack in a predefined format. The SAVEd state information may be restored using the RESTORE command, below.

Command: RESTORE

This command functions to discard the current state of text abstractor 90 and restores a SAVEd state from the top of the stack. In a preferred embodiment, when a RESTORE is activated the stack is popped. Thus, a SAVEd state may only be RESTOREd once, although once RESTOREd it can be immediately SAVEd again. Should the stack be empty, the RESTORE command will have no effect.

Command: TRYFIT

This command determines if the document, as processed so far, will fit in the maximum allotted space. If it will, the complete document is written to out to output buffer 25. At this point all remaining commands will be ignored. In addition, the abstracted text may be transmitted by RF transmission unit 80 once it has been placed in output buffer 25.

When determining whether the document will fit into the maximum allotted space, TRYFIT considers the ChunkBegin, ChunkSep and ChunkEnd strings. As an example of this assume that pager memory contains 80 characters as does output buffer 25. Since the message, as transmitted will include ChunkBegin, ChunkSep and ChunkEnd strings it will be necessary for the actual text combined with these strings not to exceed 80 characters. Thus, for example, if an abstracted message contains one ChunkBegin string and 5 ChunkSep strings each being a single character, only 74 spaces will be left for actual message text. In this case the TRYFIT command will limit the text to 74 characters.

Command: ABBREV

This command is used to abbreviate the text of the document. The process is controlled by five parameters which are discussed below.

Command: SORTCHUNKS

When this command is executed, the chunks of the document are sorted according to their significance. The significance of a chunk is based upon a number of factors, including the significance of the words in the chunk, the number of words in the chunk and the type and position of the chunk. The operation of this command is described in detail below.

Command: NOSTOPLIST

This command disables the use of the STOP list which contains those words which are always INSIGNIFICANT as specified by a user or administrator. These words are excluded from the significance computation as will be explained below. Examples of words contained in the STOP list include "the", "and", and "of". The STOP list is read from a file (preferably named stoplist.txt) which contains a free form list of STOP words.

Command: NOSIGLIST This command disables the use of the SIGNIFICANT word list which contains those words which are always considered to be SIGNIFICANT. Examples of such words include "urgent", "important" and "priority". By default, the SIGNIFICANT word list is used to boost the significance of these words during significance computation. The SIGNIFICANT word list is preferably contained in a file named siglist.txt which is a free form list of SIGNIFICANT words selected by a user or an administrator.

With the above commands in mind, the operation of the text abstractor 90 is now described according to a preferred embodiment of this invention.

As mentioned above, a document is first processed by dividing the document into chunks. Once divided into chunks, a COUNTWORDS command may be executed. There are six chunk type/subtype combinations in which words may appear:

1) MAIL HEADER/SIGNIFICANT
2) MAIL HEADER/INSIGNIFICANT
3) TEXT/FIRST
4) TEXT/LAST
5) TEXT/ONLY
6) TEXT/OTHER

These represent all chunk type and subtypes except the PUNCTUATION chunk type. Thus, a COUNTWORDS command would parse chunks having any of the above six chunk type/subtype combinations. In a preferred embodiment, a TEXTONLY command is included so that all PUNCTUATION data is immediately discarded. As the chunks are parsed in response to the COUNTWORDS command word significance is determined for each word appearing in the document. This is necessary, as will be discussed later, for both the ordering of chunks as well as the removal of particular word from the message prior to transmission.

Word significance is determined according to six parameters. The six parameters are:

1) cw-FirstInPar;
2) cw-LastInPar;
3) cw-OnlyInPar;
4) cw-OtherInPar;
5) cw-Header; and
6) cw-SigHeader.

Each of the parameters is assigned a default value although this value may be modified by a user and/or administrator. In the preferred embodiment, the following default values are used:

cw-FirstInPar=2;
cw-LastInPar=2;
cw-OnlyInPar=2;
cw-OtherInPar=1;
cw-Header=0; and
cw-SigHeader=3.

Any time a particular word appears in a location corresponding to one of the above parameters, "points" are attributed to that word based upon the assigned parameter value. For example, any time the word "FOOTBALL" appears in a chunk that is the first chunk in a paragraph (FirstInPar), the word "FOOTBALL" will be given 2 points (assuming the above default values). Each further occurrence of the word "FOOTBALL" will result in some additional points based upon its location in another chunk. The cw-OtherInPar parameter corresponds to words occurring in TEXT chunks that are neither the first nor the last sentences of a paragraph. The cw-OnlyInPar parameter corresponds to words which occur in chunks that make up the only sentence of a particular paragraph. The cw-Header parameter corresponds to words occurring in MAIL HEADER/INSIGNIFICANT chunks. Finally, the cw-SigHeader corresponds to words occurring in MAIL HEADER/SIGNIFICANT chunks.

Once all of the points for a word based upon these parameters have been summed, the total is compared to cw-MinPoints. In the preferred embodiment, the default value of cw-MinPoints is 3 although this value may be modified by a user or administrator or may be defaulted to some other value. If the word does not reach the cw-MinPoints threshold, then its significance is assigned the value of cw-InfreqSig. In the preferred embodiment, the default value of cw-InfreqSig is 0 although this value may be modified by a user or administrator or may be defaulted to some other value. If the minimum number of points has been reached, then the number of points in excess of the minimum is multiplied by cw-Factor, and the result is added to cw-BaseValue. In the preferred embodiment, the default value of cw-Factor is 1 and the default value cw-BaseValue =0 although these values may be modified by a user or administrator or may be defaulted to some other value. The resulting value based upon the above calculation gives the significance for that word.

It should be noted that if a particular word is on the STOP list (always INSIGNIFICANT) then the above process does not take place with respect to that word unless the NOSTOPLIST command is in effect. When the NOSTOPLIST command is not in effect and a word is contained on the STOP list then the word is immediately assigned a significance value of cw-StopSig. The default value for cw-StopSig is preferably zero.

The ABBREV command is next discussed. As described above, this command causes the text of the document to be abbreviated prior to placement in buffer 25. The process is controlled by five parameters. The first parameter is ab-UseDict. If this parameter is true (the default), then a table of abbreviations is read from a file preferably called abbrev.txt. Any word in the document that appears in this table of abbreviations is replaced by the corresponding abbreviation contained within the table. In a preferred embodiment, each line of abbrev.txt contains two words. The first is the original word, and the second is its corresponding abbreviation. In a preferred embodiment, when the replacement is used, text abstractor 90 will match the case of the replacement word with that of the original, unabbreviated word.

Another desirable feature of the ABBREV function is the ability to abbreviate phrases (i.e. more than one word mapping to a single abbreviation). For example, various phrases such as "New York" may be contained in the abbrev.txt file with a corresponding abbreviation of "NY".

The second parameter is ab-DropVowels. If this parameter is true (NOT the default), than any word which is not specified for an abbreviation in abbrev.txt is abbreviated in the abstracted message by removing all of the vowels in that word. The third parameter is ab-DropFirstVowels. first parameter is true (NOT the default) then vowels are dropped even if they are the first letter in a word, otherwise they are retained.

The fourth parameter is ab-TrimWhite. When this parameter is true (the default), then multiple white space characters are replaced by a single space. Finally, the last parameter is ab-TrimPunct. If this parameter is true (NOT the default), then all white space is removed around any punctuation.

The next command discussed is the SORTCHUNKS command. As discussed above, in a preferred embodiment, chunks are reordered in the abstracted document as compared to the original document according to their significance. In a preferred embodiment, the abstracted document is ordered so that the most significant chunks are first. The significance of chunks is determined by the collective significance of the words contained within that chunk, the number of words in that chunk and the type and subtype of the chunk. If a chunk has fewer words than sc-MinLength, then its significance is set to sc-ShortSig. The preferred default value for sc-MinLength is 4 and the default value for sc-ShortSig is 0.

Assuming that a chunk meets the sc-MinLength threshold, its significance is determined starting with a base significance value. The base significance value assigned is determined by the chunk position. The parameter sc-FirstInPar indicates a chunk that is the first sentence of a paragraph, the parameter sc-LastInPar indicates a chunk that is the last sentence of a paragraph, the parameter sc-OnlyInPar indicates a chunk that is the only sentence of a paragraph and the parameter sc-OtherInPar indicates a chunk that is a "middle" sentence in a paragraph. The default values for each of these parameters are:

sc-FirstInPar=0;
sc-LastInPar=0;
sc-OnlyInPar=0; and
sc-OtherInPar=0.

In addition, if the COUNTWORDS command has been previously executed, the significances of the words contained within the chunk are totaled and added to the base significance value for the chunk to obtain the overall significance value for the chunk. Each of the chunks may then be moved to output buffer 25 in order of significance.

Another feature that may be desirable in the abstraction process is the ability to delete particular words (OMIT WORDS) in their entirety. In this case OMIT WORDS contained within a file (e.g. omitwds.txt) never appear within the abstracted text even if they are contained within a chunk that is otherwise significant enough to be placed in output buffer 25. By omitting these OMIT WORDS, additional room in output buffer 25 may be provided for less significant chunks that would otherwise not make the output buffer 25.

An additional feature which may be implemented in text abstractor 90 involves parenthetical phrases. Such phrases may be dealt with by determining the overall value for the chunk with the parenthetical phrase contained therein. This is accomplished as discussed above by determining the collective significance of all the words contained within the chunk including the words in the parenthetical phrase. Then, the collective significance of the chunk without inclusion of the words in the parenthetical phrase is determined. A threshold difference value is specified and if the difference in the respective significances is smaller than the threshold value, then since there is not much difference, the parenthetical phrase may be omitted from the abstracted text. Otherwise, if the difference in significances is at or larger than the threshold value then the parenthetical phrase is retained.

Figure 4A:
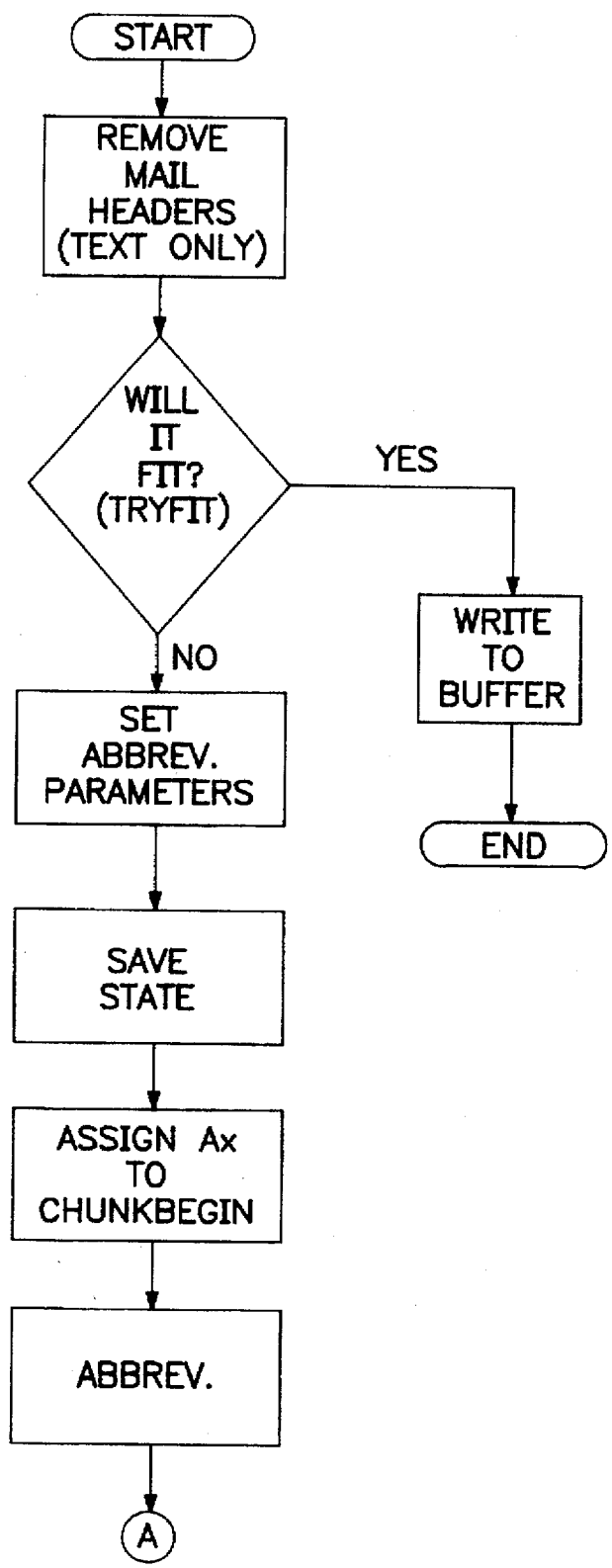
FIGS. 4(a), 4(b) and 4(c) are a flowchart describing the processing of particular set of commands in the abstraction process of the preferred embodiment of this invention.
Figure 4B:
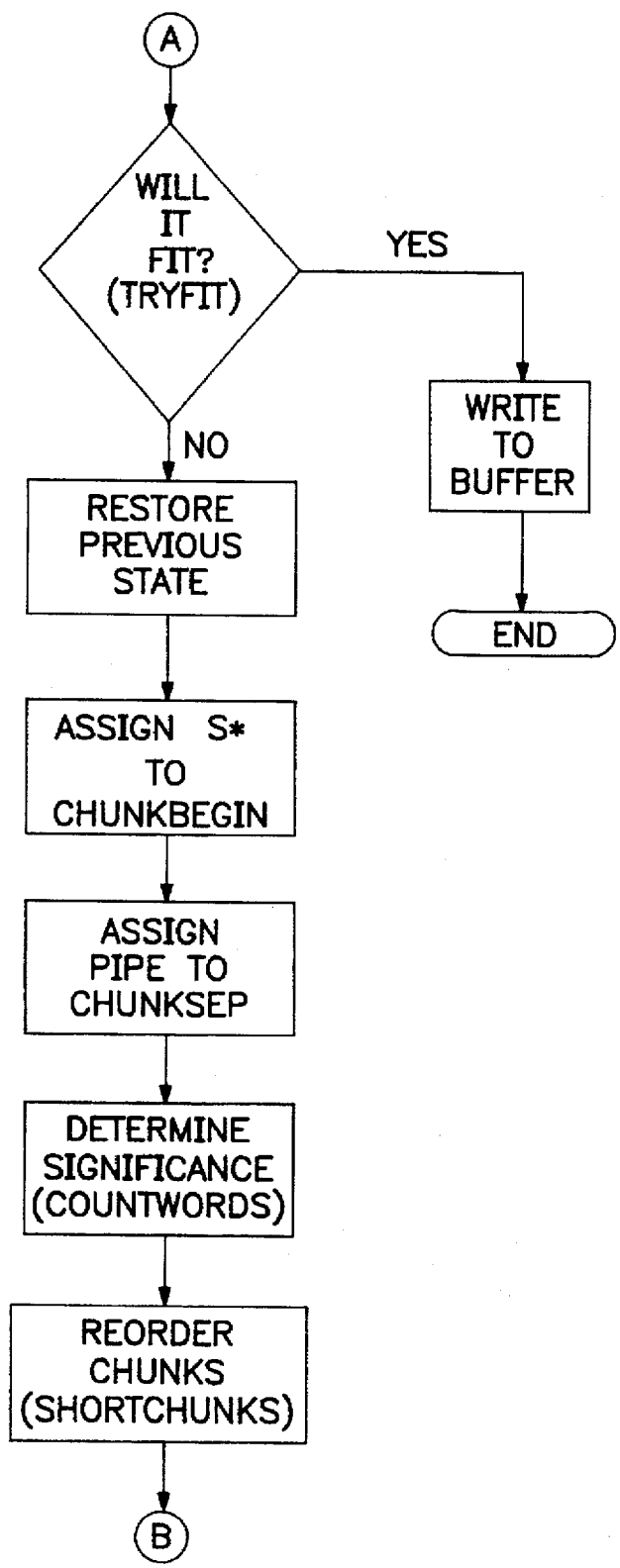
Figure 4C:
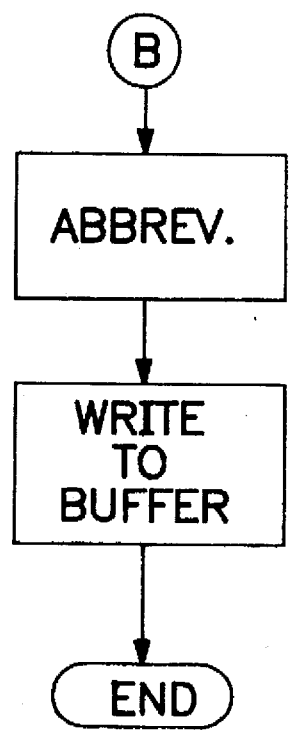

With reference to FIGS. 4(a), 4(b) and 4(c), an example set of commands is now given and the processing performed by the text abstractor based upon that set of commands is described.

```
textonly
tryfit
ab-trimwhite=true
ab-trimpunct=true
save
    chunkbegin=a*
    abbrev tryfit
    restore
chunkbegin=s*
chunksep=|
countwords
sortchunks
abbrev
```

The TEXTONLY command is used to remove all of the mail headers and punctuation lines. Once completed, the TRYFIT command determines whether the document is now short enough. It should be noted that it does not matter if the document was already short enough with the mail headers; the length is not checked until after the headers are removed. Next, the ab-trimwhite and ab-trimpunct parameters are set to true in preparation for a later ABBREV command.

The SAVE command saves away all of the state information until the next RESTORE. It is used here because it is desired to try to abbreviate the document before chunks are rearranged based upon significance. The SAVE and RESTORE commands allow for abbreviation of the document but with the ability to return to the unabbreviated state if it turns out that the abbreviating was not sufficient to fit the document into the required space. It is not possible to simply abbreviate and then compute significances without using SAVE and RESTORE because the abbreviated words are likely not to be recognized properly when re-processing the significance computation.

ChunkBegin is set to a* (for "abbreviated only") so that if the abbreviating is sufficient alone to fit the document, the transmitted text will be marked with an "a*" at the beginning as an indication to the receiver of the document. Later, if abbreviating is not alone sufficient, ChunkBegin is changed to "s*" to indicate that the text has been sorted and selected by significance. Thus, starting from the most significant chunks and proceeding towards the less significant chunks, it may be that some of the less significant chunks will be omitted from the transmission if the buffer 25 otherwise fills with more significant chunks.

The command ABBREV next abbreviates the text and then TRYFIT checks to see if the document is now short enough. If it is, the text abstractor 90 writes the text to buffer 25 and the message is transmitted by RF transmission unit 80. Otherwise, the text abstractor 90 continues on to the RESTORE command, which restores the state to the previous SAVE, that is, before the abbreviating.

ChunkBegin is set to "s*" to indicate that sorting and selection have occurred and ChunkSep is set to a pipe, to further indicate to the message recipient that pieces of the message have been rearranged. The COUNTWORDS command is next executed to compute the significance of words and chunks and then the text is rearranged based upon chunk significance. A final ABBREV gets the text a little smaller, and the commands are completed. Text abstractor 90 then writes out to buffer 25 as much as will fit for transmission by RF transmission unit 80.

Further compaction of document size is also possible through an alternative preferred embodiment. In such alternative preferred embodiment, all of the processing described above takes place. Specifically, abbreviation, chunk reordering and header deletion may occur. In addition, in this alternative preferred embodiment, additional document compaction is achieved by selective removal of words from the document. This may occur either before or after the above processes. For example, relatively insignificant words may be removed prior to abbreviation and/or chunk reordering. Alternatively, relatively insignificant words may be removed after abbreviation and/or chunk reordering.

In this embodiment, a COUNTWORDS command is executed at the desired time within the command language script. It is necessary to execute the COUNTWORDS command so that each of the words in the document may be assigned a significance value. Once this is done, words having a significance value below a certain pre-determined threshold may be removed from the abstracted message. Alternatively, when chunk reordering is performed prior to word removal, during the word removal phase words may be selected to remain in the abstracted message based upon having a relatively high word significance. For example, if the available buffer space is 80 characters and all of the words in the message following chunk reordering (and possibly abbreviation) amount to 90 characters, instead of removing the least significant chunk from the message it may be possible to remove words amounting to a total often characters. The removed words may come from multiple chunks. By removing the low significance words, it may become unnecessary to remove the least significant chunk in its entirety.

The invention has been described in detail in connection with the preferred embodiments. These embodiments, however, are merely for example only, and the invention is not limited thereto. It will be easily understood by those skilled in the art that other variations and modifications may easily be made within the scope of this invention as defined by the appended claims.

We claim:

1. A method for abstracting input text into output text having a given maximum length, said method comprising the steps of:
   dividing said input text into a plurality of chunks, said chunks having at least one word;
   assigning a significance to said words of a chunk;
   assigning a significance to at least some of said plurality of chunks based upon the significance of words contained within said chunks; and
   selecting a subset of said chunks for inclusion in said output text based upon the relative significances of said chunks.

2. The method of claim 1 wherein said selection step comprises selecting the most significant chunks for inclusion in said output text.

3. The method of claim 1 wherein said step of assigning a significance to at least some of said plurality of chunks further comprises the step of classifying at least some of said plurality of chunks based upon predetermined criteria and wherein said significance assigned to a word is dependent upon the classification of the chunk containing said word.

4. The method of claim 3 wherein the significance of a chunk is determined according to the collective significance of the words contained within that chunk.

5. The method of claim 4 wherein the significance of said chunk is further determined according to predetermined chunk criteria.

6. The method of claim 3 wherein said classifications available for said chunks comprise MAIL HEADER, TEXT and PUNCTUATION.

7. The method of claim 6 wherein said MAIL HEADER classification further comprises SIGNIFICANT and INSIGNIFICANT subclassifications and said TEXT classification further comprises FIRST, LAST, ONLY and OTHER subclassifications.

8. The method of claim 1 wherein at least some of said chunks represent a sentence in said input text.

9. The method of claim 1 wherein the significance of said words is determined according to the collective significances corresponding to each occurrence of said word.

10. The method of claim 9 wherein particular words always have a zero significance.

11. The method of claim 9 wherein particular words always have a booted significance.

12. The method of claim 9 wherein in a case where the collective significance corresponding to a word is below a given threshold, that word is assigned a zero significance.

13. The method of claim 1 wherein control of said abstraction process is interactive.

14. The method of claim 1 wherein control of said abstraction process is accomplished in batch.

15. The method of claim 6 wherein PUNCTUATION chunks are discarded.

16. The method of claim 6 wherein secondary MAIL HEADERs are discarded.

17. A method for abstracting a textual message consisting of a plurality of words, said abstraction comprising the steps of:
   dividing said textual message into a plurality of chunks, said chunks having at least one word;
   classifying said chunks according to predetermined criteria;
   assigning a significance value to said words according to the classification of the chunk containing said words;
   assigning a significance value to said chunks according to the total significance values for the words contained in said chunks;
   writing said chunks to an output buffer in order of significance of said chunks wherein most significant chunks are written to said output buffer prior to any less significant chunks.

18. The method of claim 17 further comprising the step of transmitting the chunks contained in said output buffer after said output buffer is filled.

19. The method of claim 17 further comprising the step of abbreviating said words.

20. The method of claim 19 wherein said words are abbreviated according to an external file containing original words and corresponding abbreviations.

21. The method of claim 19 wherein said step of abbreviating said words includes the step of removing the vowels from said words.

22. The method of claim 17 wherein predetermined words are not written to said output buffer even if such words are contained in a chunk which is written to said output buffer.

23. The method of claim 17 wherein parenthetical statements are discarded in the event that the significance of a chunk containing said parenthetical statement is not diminished beyond a predetermined threshold when said parenthetical statement is eliminated from said chunk.

24. A paging system comprising:

an input source for receiving textual information;

a memory operatively connected to said input source for storing said received textual information;

text abstraction means for abstracting said received textual information; and a controller communicating with said memory and with said text abstraction means for controlling the operation of said paging system;

an output buffer for storing said abstracted textual information.

25. The paging system of claim 24 further comprising an RF transmission unit for transmitting said abstracted textual information and a paging receiver for receiving said abstracted textual information.

26. The paging system of claim 24 wherein said text abstraction means further comprises:

division means for dividing said received textual information into a plurality of chunks, said chunks having at least one word;

means for assigning a significance to said words of a chunk;

means for assigning a significance to said chunks based upon the significance of the words contained within said chunks;

selection means for selecting a subset of said chunks for inclusion in said output buffer based upon the relative significance of said chunks; and means for writing said selected chunks into said output buffer.

27. The paging system of claim 26 wherein chunks are written to said output buffer in order of decreasing significance.

28. The paging system of claim 26 wherein said means for assigning a significance to said words of a chunk further comprises means for classifying each chunk based upon predetermined criteria.

29. The paging system of claim 28 wherein said means for assigning a significance to said words of a chunk assigns a significance to said word according to the classification of the chunk containing said word.

30. The paging system of claim 29 wherein said means for assigning a significance to each of said chunks assigns a significance to each of said chunks according to the collective significance of the words contained within that chunk.

31. The paging system of claim 30 wherein the significance of each said chunk is further determined according to that chunk's position in said received textual information.

32. A device for abstracting a text message, said device comprising:

input means for receiving said text message;

means for dividing said text message into a plurality of chunks, said chunks having at least one word;

means for classifying said chunks according to predetermined criteria;

means for assigning a significance value to said words according to the classification of the chunk containing said words;

means for assigning a significance value to said chunks according to the total significance values for the words contained in said chunks;

an output buffer; and means for writing said chunks to said output buffer in order of decreasing significance.

33. The device of claim 32 further comprising means for transmitting the chunks contained in said output buffer after said output buffer is filled.

34. The device of claim 33 further comprising means for abbreviating said words.

35. The device of claim 34 wherein said words are abbreviated according to an external file containing original words and corresponding abbreviations.

36. The device of claim 35 wherein said words are abbreviated by removing the vowels from said words.

37. The device of claim 32 further comprising means for discarding a parenthetical statement in the event that the significance of a chunk containing said parenthetical statement is not diminished beyond a predetermined threshold when said parenthetical statement is eliminated from said chunk.

38. The method of claim 1, wherein said input text comprises an electronic mail message.

39. The method of claim 3, wherein said predetermined criteria include location within said input text.

40. The method of claim 5, wherein said predetermined chunk criteria include position of said chunk in said input text.

41. The method of claim 17, wherein said textual message comprises an electronic mail message.

42. The method of claim 17, wherein said predetermined criteria include position in said textual message.

43. The paging system of claim 24, wherein said textual information comprises an electronic mail message.

44. The paging system of claim 28, wherein said predetermined criteria include location of said chunk within said received textual information.

45. The device of claim 32, wherein said text message comprises an electronic mail message.

46. The device of claim 32, wherein said predetermined criteria include position of said chunk in said text message.

* * * * *